United States Patent Office 3,469,980

Patented Sept. 30, 1969

3,469,980

DESCUMMING SOLUTION FOR ETCHING

Karl Heyman, Montclair, and Harold Messerschmidt, Stockholm, N.J., assignors to Mona Industries, Inc., Paterson, N.J., a corporation of New Jersey No Drawing. Filed June 27, 1966, Ser. No. 560,847

Int. Cl. G03f *7/10;* C09k *3/00*

U.S. Cl. 96—36.3 4 Claims

ABSTRACT OF THE DISCLOSURE

A process of descumming a zinc photoengraving plate by treating the plate with an aqueous solution of 8 to 10 weight percent oxalic acid, and 0.3 to 1.5 weight percent nitric acid.

This invention relates to a descumming solution for etching. The invention more particularly relates to a descumming and cleaning solution for cleaning zinc plates in the photoengraving etching process.

In one known photoengraving process a zinc photoengraving plate, generally produced of micro-crystalline zinc, and coated with a photo-sensitive coating, such as a bichromate coating, is exposed to an actinic light image, as for example by exposure to actinic radiation through a photographic negative, the action of the actinic light image hardening and/or insolubilizing the photo-sensitive coatings in the lightstruck area. The unhardened areas of the photo-sensitive coating which correspond to the dark or non-lightstruck areas are then washed away, as for example, under a stream of clean warm water, generally with a gentle rubbing of the surface, as for example with a sponge or other soft material. The remaining insoluble areas which correspond to the lightstruck areas represent the etch-resist and protect these areas from the action of the acid in the subsequent etching process. The etching may be carried out in specially designed spray machines, according to the Dow Powderless Etching Process as described in U.S. Patents 2,640,763 and 2,669,048. Nitric acid together with a filming agent, as for example, a petroleum hydrocarbon and an emulsifier may be used as the etching solution which is sprayed against the plate. The acid solely attacks and etches into the non-resist areas of the plate and the acid etching practically solely occurs in a vertical direction into the surface of the plate with horizontal attack or side etching, also called undercutting, being prevented by the protective action of an acid-resisting film which forms on the sidewalls.

The etching may, for example, be utilized in forming ordinary linework or as a halftone engraving where shade variations are required as compared with linework. In halftone engraving the negatives are exposed behind a halftone screen so that the various shades or tones in the original are represented by separate dots of various size and density on the developed image, each half-tone dot representing a minute portion of the picture.

In order to assure a uniform high quality etching and a clean etchout from the start, the non-resist area on the plates must be thoroughly cleaned before the etching is commenced, as for example, before the plates are placed into the etching machine. For this purpose the exposed, developed and washed plates with the photo-resist areas are washed and rubbed off with a special solution known as a descumming solution. The descumming solution is generally an aqueous solution containing, for instance about 11% by volume of 66° Bé. sulfuric acid and 1.1% by volume of nitric acid of 42° Bé. While this acid mixture quickly and effectively cleans and descums the non-resist areas allowing a subsequent uniform and clean etch-out, it has the undesirable characteristic of additionally etching the zinc surface of the plate and removing stock therefrom. Unfortunately the stock removal is not only in a vertical direction but occurs horizontally undercutting beneath the resist and impairing the fidelity, sharpness and resolution of the plate. In connection with halftone dots fine detail may be entirely lost due to the loss of the dots or part thereof.

The descumming solution must thus very carefully be applied in very controlled short lengths of time and furthermore after the descumming treatment the plate while still wet must be etched without drying as any drying out of the plate will destroy the benefit of the descumming treatment.

The use of the weaker acid solutions which will not attack and undercut the metal does not effectively descum.

One object of this invention is a novel descumming solution which will effectively descum zinc etching plates without any substantial undercuting.

A further object of this invention is a descumming solution which will effectively descum zinc etching plates and which can be dried and stored after the descumming and prior to the etching.

These and still further objects will become apparent from the following description:

In accordance with the invention we have surprisingly discovered that an aqueous solution of nitric and oxalic acid constitutes a highly effective descumming solution which exhibits a minimum of attack and undercuting on the zinc plate. The descumming solution in accordance with the invention may contain from 8 to 10% by weight of axalic acid, and 0.3 to 1.5% by weight of nitric acid.

Preferably the descumming solution in accordance with the invention should contain about 9% by weight of oxalic acid, and about .68% by weight of nitric acid.

When using a commercially available nitric acid solution of 42 Bé. strength, about 0.5 to 2% by weight, and preferably 1% by weight of such solution may be used.

The descumming solution in accordance with the invention may be used for descumming any micro-crystalline zinc photoengraving plates which carry the developed hardened resists prior to the etching.

The descumming solution in accordance with the invention is preferably used by immersing the zinc plate into it and by gently rubbing the surface of the plate with a sponge or other soft material for the duration of 2 to 3 minutes. According to the surface condition of the plate this time may be lessened or increased. During the manipulation a grayish coating forms on the non-resist areas of the plate, and the originally clear descumming solution becomes milky in appearance and its viscosity increases. The zinc plate can be left in the descum solution for 8 minutes or longer without any harm and the etch will not be deeper than $\frac{5}{1000}$ mm.

The descumming solution in accordance with the invention is most preferably used prior to etching in accordance with the Dow Powderless Etching Process, as described above. The descumming in accordance with the invention, even after prolonged treatment removes a minimum of metal stock and will not cause any substantial undercutting. After descumming in accordance with the invention the plates may be immediately etched while still wet, as for example, by being passed into the spray of the etching machine, or may be allowed to dry at room temperature or in hot air, and may be stored prior to the etching treatment without requiring a further descumming or cleaning treatment when finally etched.

The following example is given by way of illustration and not limitation:

EXAMPLE

A conventional fine-grained zinc alloy etching plate was coated in a conventional manner with a conventional light-sensitive coating utilizing an 11 to 13% polyvinyl alcohol solution containing 5% of a 30% ammonium bichromate solution. The coated plate was exposed for about 4 minutes with a 40 amp. carbon arc at a distance of 36" through a negative. After the exposure the coated plate was placed under running tap water having a temperature of about 60° to 80° F. until the unexposed coating was washed away, which took less than 2 minutes. After this unexposed portion had been completely washed off, the coating was hardened in the conventional manner with an 8° Bé. chromic acid bath for about 30 seconds and was then again washed under running water and dried. The dried plate was then heated to about 350° to 380° F. and cooled. The plate was then immersed in a descumming solution in accordance with the invention consisting of a solution containing 9% by weight of oxalic acid and .68% by weight of nitric acid. During the immersion, which was effected for about 5 minutes, the plate was gently swabbed with cotton. The plate was then rinsed under running water and etched in a conventional quick-etch machine using an etching solution containing 11 to 13.5%, 42° Bé. technical nitric acid; .9 to 1.25% of a surface active compound (Mona Etch Base sold by Mona Industries, Inc. of Paterson, New Jersey); and 1.8 to 2.5% of an aromatic solvent (Solvesso 150). An excellent quality etching plate was obtained with a uniform high quality etch and clean etchout. The descumming treatment did not cause any detrimental horizontal attack or side-etching.

While the invention has been described in detail with reference to certain specific embodiments, various changes and modifications which fall within the spirit of the invention will become apparent to the skilled artisan. The invention is therefore only intended to be limited by the appended claims, or their equivalents wherein we have endeavored to claim all inherent novelty.

We claim:

1. In the process of photoengraving zinc plates in which a zinc plate having a photo-sensitive coating is exposed to an actinic image, the unexposed areas washed away leaving the exposed areas as a resist and thereafter the plate descummed and etched, the improvement which comprises effecting the descumming with an aqueous solution containing 8 to 10 percent by weight oxalic acid and 0.3 to 1.5 weight percent nitric acid.

2. Improvement according to claim 1 in which the etching is effected by spraying a nitric acid etching solution containing a filming agent.

3. Improvement according to claim 2 in which the plate is dried after the descumming and prior to etching.

4. Improvement according to claim 3 in which the desumming solution contains about 9% by weight of oxalic acid and about .68% by weight of nitric acid.

References Cited

UNITED STATES PATENTS

| | | | |
|---|---|---|---|
| 1,954,744 | 4/1934 | Peterson et al. | 134—41 |
| 2,060,365 | 11/1936 | Curtin | 148—6.14 |
| 2,164,042 | 6/1939 | Romig | 148—6.14 X |
| 2,302,939 | 11/1942 | De Long | 134—41 |
| 2,430,435 | 11/1947 | Sperry | 134—28 X |
| 3,051,603 | 8/1962 | Michaels | 96—36.3 X |
| 3,070,464 | 12/1962 | Levy | 134—41 |

GEORGE F. LESMES, Primary Examiner

R. E. MARTIN, Assistant Examiner

U.S. Cl. X.R.

156—14; 252—79.4, 142